United States Patent [19]

Nagatsuka et al.

[11] Patent Number: 5,355,264
[45] Date of Patent: Oct. 11, 1994

[54] RECORDING OR REPRODUCING APPARATUS

[75] Inventors: Osamu Nagatsuka, Kanagawa; Tatsuzo Ushiro, Saitama; Hiroo Edakubo, Kanagawa, all of Japan

[73] Assignee: Canon Kabushiki Kaisha, Tokyo, Japan

[21] Appl. No.: 154,153

[22] Filed: Nov. 17, 1993

Related U.S. Application Data

[63] Continuation of Ser. No. 791,991, Nov. 14, 1991, abandoned.

[30] Foreign Application Priority Data

| Nov. 20, 1990 | [JP] | Japan | 2-312743 |
| Nov. 30, 1990 | [JP] | Japan | 2-329861 |
| Nov. 30, 1990 | [JP] | Japan | 2-329865 |
| Nov. 30, 1990 | [JP] | Japan | 2-329866 |

[51] Int. Cl.⁵ ............................. G11B 15/66
[52] U.S. Cl. ........................................ 360/85
[58] Field of Search ........................ 360/85, 84

[56] References Cited

U.S. PATENT DOCUMENTS

| 4,025,959 | 5/1977 | Warren | 360/85 |
| 4,213,162 | 7/1980 | Lemelson | 360/85 |
| 4,706,140 | 11/1987 | Muller | 360/85 |
| 4,745,498 | 5/1988 | Maeda et al. | 360/85 |
| 4,985,789 | 1/1991 | Kodama et al. | 360/85 |
| 5,025,332 | 6/1991 | Tsuchida et al. | 360/85 |
| 5,159,507 | 10/1992 | Tamura et al. | 360/85 |

Primary Examiner—Robert S. Tupper
Attorney, Agent, or Firm—Robin, Blecker, Daley & Driscoll

[57] ABSTRACT

An apparatus arranged to record or reproduce signals on or from a tape-shaped recording medium contained in a cassette, with tape reels and a pinch roller disposed within the cassette, by guiding and causing the medium to travel in an oblique posture relative to a cylindrical drum having magnetic heads comprises a moving mechanism arranged to move a first chassis which holds and carries the cassette and a second chassis which carries the drum relative to each other, a capstan disposed on the second chassis, and an urging member arranged to urge the capstan to be in pressed contact with the pinch roller. The capstan is thus arranged to be brought into pressed contact with the pinch roller by the urging force of the urging member.

21 Claims, 13 Drawing Sheets

RECORDING OR REPRODUCING APPARATUS

This is a continuation application under 37 CFR 1.62 of prior application Ser. No. 791,991, filed Nov. 14, 1991, now abandoned.

BACKGROUND OF THE INVENTION

1. Field of the Invention:

This invention relates to a recording or reproducing apparatus and more particularly to an apparatus arranged to record or reproduce signals on or from a tape-shaped recording medium (hereinafter referred to as the tape) by guiding and allowing the tape to travel obliquely around a head drum on which heads are mounted.

2. Description of the Related Art:

Recording density has increased of late. As a result, it has become possible to advance the reduction in size of the recording or reproducing apparatus of the above-stated kind. In connection with the reduction in size, cassette type tape recorders have been contrived to wrap the tape around the head drum without pulling the tape out of a cassette in which the tape is contained.

FIG. 1 of the accompanying drawings shows a tape recorder of this kind which is disclosed in Japanese Utility Model Publication No. SHO 63-36536 (hereinafter referred to as the prior art example). FIG. 1 shows in an oblique view the relative movement of a head drum 1 and a tape cassette 6 of the prior art example as in a state of having the upper half of the cassette removed.

Referring to FIG. 1, pinch rollers 9 and 10 and tape guides 11 and 12 are disposed within the tape cassette 6. A tape transport system is arranged to be completed when the tape 14 is wrapped around the head drum 1 with the head drum 1 set in a given position by bringing the head drum 1 close to an aperture provided in the middle part of the tape cassette 6. This arrangement obviates the necessity of any additional tape loading mechanism, so that the mechanism of the tape recorder can be simplified for reduction in cost.

As described above, the prior art example is arranged to form a tape path with the head drum 1 allowed to come into the tape cassette 6 by moving either the head drum 1 or the tape cassette 6. With the tape path formed in this manner, however, it is hardly possible to have a constant pressed contact force between the pinch roller 9 and a capstan 13, because the pressed contact force of the capstan 13 on the pinch roller 9 is determined only by the position of the capstan 13 relative to the pinch roller 9. Therefore, the pressed contact force is inconstant to become either insufficient or excessive. The inconstant pressed contact force might cause slipping of the tape or a deformation of the tape cassette and thus has presented a problem.

Further, the capstan 13 is in pressed contact with the pinch roller 9 with the tape 14 in a state of being wrapped around the head drum 1. The capstan 13, however, must be sometimes rotated at a high speed when recorded signals are to be reproduced at a high tape transporting speed, for example, in a cue or review mode. To meet this requirement, it is necessary to use a large motor for driving the capstan 13. Therefore, while the size of the mechanism is reducible, the use of the large capstan driving motor has prevented a reduction in size and weight of the tape recorder as a whole.

SUMMARY OF THE INVENTION

This invention is directed to the solution of the problems of the prior art example mentioned in the foregoing. It is, therefore, a principal object of the invention to provide a recording or reproducing apparatus which is of the kind recording or reproducing signals on or from a tape contained in a tape cassette having pinch rollers disposed therein, by moving the tape cassette and a drum relative to each other, and is arranged to be capable of securing a stable tape feeding force despite of simple arrangement by stabilizing the pressed contact force of a capstan on the pinch roller and thus to permit a reduction in size and weight of the apparatus as a whole.

To attain this object, an apparatus arranged as an embodiment of this invention to record or reproduce signals on or from a tape by guiding and causing the tape to travel in an oblique posture relative to a cylindrical head drum having a head mounted thereon comprises: a first chassis arranged to hold a tape cassette which contains the tape, tape reels and a pinch roller therein; a second chassis arranged to hold the head drum; a moving mechanism for relatively moving the first and second chassis; a capstan disposed on the second chassis; and urging means for pressing the capstan against the pinch roller, wherein the capstan is brought into pressed contact with the pinch roller by an urging force of the urging means.

It is another object of the invention to provide a recording or reproducing apparatus which is arranged not only to attain the above-stated principal object (particularly the reduction in size) but also to be operable in a mode of reproducing signals at a high tape transport speed, despite of the reduced size of the apparatus.

To attain that object, an apparatus arranged as an embodiment of the invention to record or reproduce signals on or from a tape by guiding and causing the tape to travel in an oblique posture relative to a cylindrical head drum having a head mounted thereon comprises: a moving mechanism for relatively moving the head drum with respect to a tape cassette which contains the tape, tape reels and a pinch roller therein; a capstan disposed on a turnable lever; urging means for urging the lever to move toward the pinch roller; pressed-contact releasing means for releasing the capstan from being in pressed contact with the pinch roller, by causing the lever to turn against an urging force of the urging means.

In the above-stated embodiment, the lever and the capstan which is disposed on the lever are arranged to turn when the tape is being guided relative to the head drum. A given urging force is exerted to move the lever toward the pinch roller in such a way as to stabilize a pressed contact force which keeps the capstan in pressed contact with the pinch roller. Further, the capstan can be released from being in pressed contact with the pinch roller under this condition. This arrangement makes the embodiment capable of adequately operating in any of various operating modes without increasing the size of a capstan driving motor.

In another embodiment of the invention, a chassis is arranged to carry a head drum and a capstan while another chassis is arranged to carry a tape cassette. These chassis are arranged to be displaceable relative to each other to different relative positions, including: a first relative position, wherein the tape is wrapped around the head drum and is in a state of being pinched between the pinch roller and the capstan to permit signal recording or reproduction; a second relative position, wherein the tape is situated apart from the head drum and, at the same time, the pinch roller and the capstan are situated apart from each other; and a third relative position, wherein the tape is wrapped around the head drum at a smaller wrap angle than a tape wrapping angle in the first relative position and the pinch roller and the capstan are situated apart from each other.

The above-stated arrangement of the embodiment permits the tape loading state of the embodiment to be variously set by just moving these chassis relative to each other. The invented arrangement, therefore, contributes to the simplification of the mechanism of the apparatus for reduction in cost.

The above and other object and features of the invention will become apparent from the following detailed description of embodiments thereof taken in conjunction with the accompanying drawings.

DETAILED DESCRIPTION OF THE PREFERRED EMBODIMENTS

The following describes the details of this invention by way of example through embodiments thereof with reference to the accompanying drawings:

First Embodiment

Figure 1:
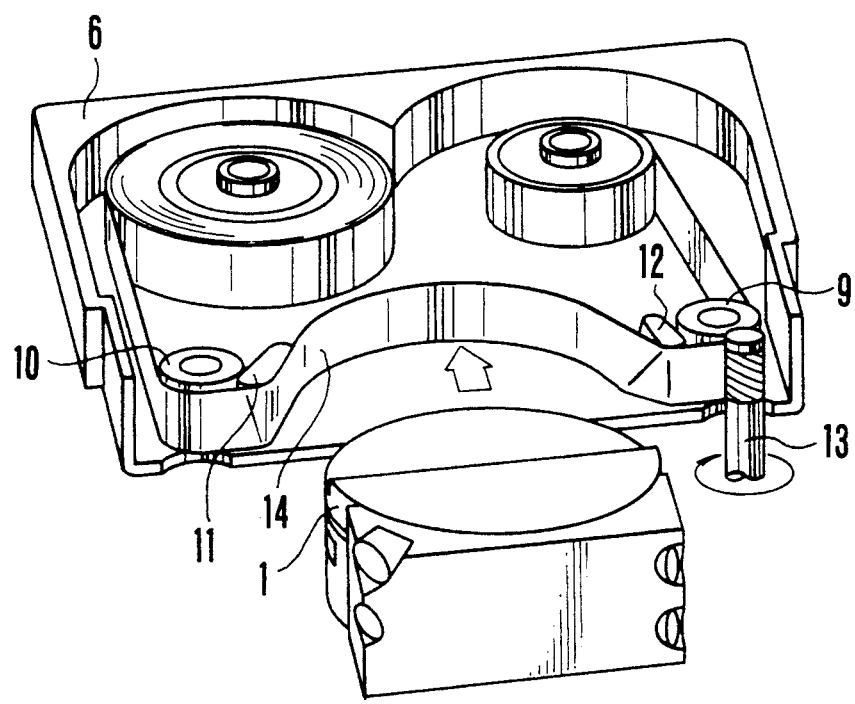
FIG. 1 is an oblique view showing a tape recorder as an example of the prior art with the upper half of a tape cassette removed.
Figure 2:
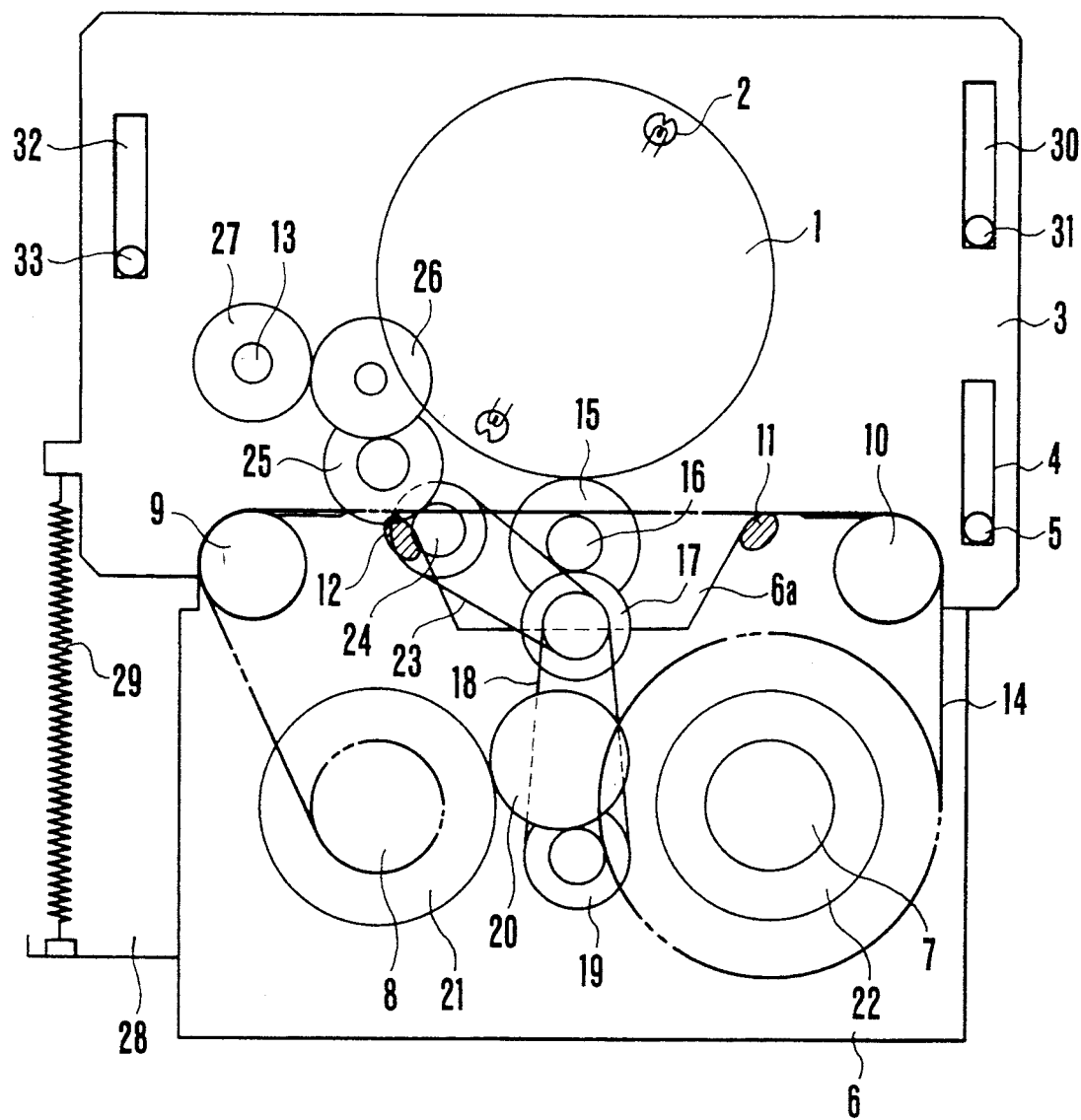
FIG. 2 is a plan view showing a tape recorder which is arranged as a first embodiment of this invention, the tape recorder being shown as in a state obtained immediately after loading a tape cassette.
Figure 3:
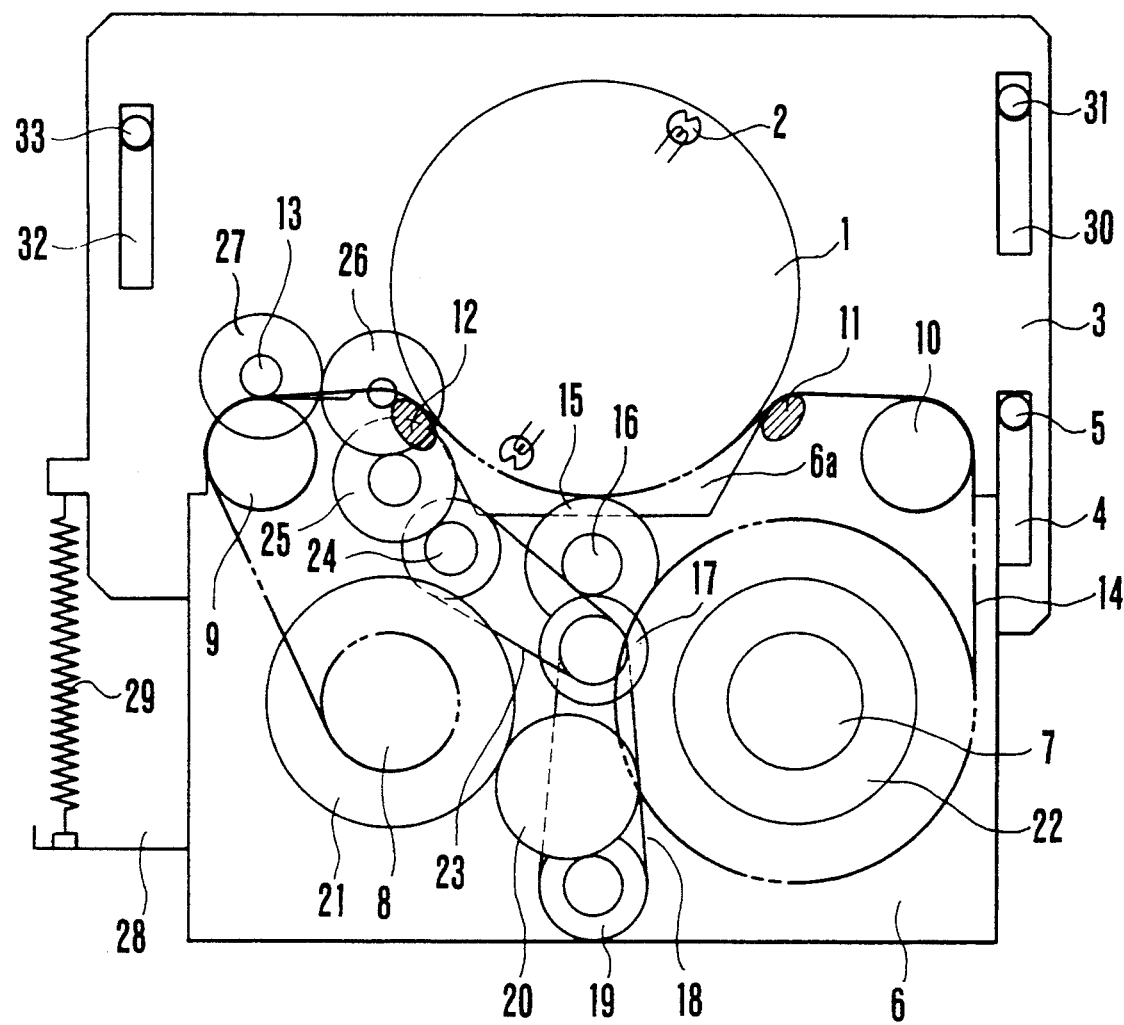
FIG. 3 is a plan view showing the first embodiment as in a state of recording or reproducing signals.

The first embodiment of the invention is described with reference to FIGS. 2 and 3. FIG. 2 shows a tape recorder which is arranged as the first embodiment of the invention. Tape recorder is shown as in a state obtained immediately after the tape recorder is loaded with a tape cassette. FIG. 3 shows the same tape recorder as in a recording or reproducing state.

Referring to FIGS. 2 and 3, a plurality of magnetic heads 2 are mounted on a head drum 1 respectively in given positions. The head drum 1 is arranged to be driven to rotate by a drum driving motor which is not shown. The head drum 1 is secured to a movable chassis 3. The chassis 3 is arranged to be vertically movable, as viewed in FIGS. 2 and 3, through guide slots 4, 30 and 32 which are provided in the chassis 3 and guide pins 5, 31 and 33 which are erected on a stationary chassis 28. The chassis 28 is arranged to hold a tape cassette 6.

A magnetic tape 14 is contained in the tape cassette 6. A supply reel 7, a take-up reel 8 and pinch rollers 9 and 10 are arranged within the tape cassette 6. The tape cassette 6 is provided further with tape guides 11 and 12 for guiding the tape 14 to a given path on the head drum 1 when the head drum 1 comes into an aperture part 6a provided in the tape cassette 6. These tape guides 11 and 12 are respectively disposed on the entrance side and the exit side of the aperture part 6a relative to the head drum 1. Since the pinch rollers 9 and 10 are disposed on the right and left sides of the tape cassette 6, signals can be recorded or reproduced even in cases where the tape is arranged upside down. The capstan 13 is arranged to be in pressed contact with the pinch roller 9 across the magnetic tape 14 and thus to cause the magnetic tape 14 to travel toward the take-up reel 8.

The chassis 3 is urged to move toward the tape cassette 6 by means of a spring 29. The spring 29 is arranged to control and set a pressed contact force of the capstan 13 on the pinch roller 9 as will be described in detail later herein.

A drive transmission system of the tape recorder is described as follows: The reel system and the capstan 13 are arranged to be rotatively driven via a transmission system by means of a driving motor 15 which is disposed on the chassis 3. The reel system is connected to the motor 15 in the following manner: A tape take-up action is performed by connecting the motor 15 to a gear 21 on the take-up side or a gear 22 on the supply side through a gear 16 which is mounted on the output side of the driving motor 15, a gear 17, a belt 18, a gear 19 and an idler 20.

The capstan 13 is likewise connected to the driving motor 15 by the gear 17 through a belt 23 and gears 24, 25 and 26 and a gear 27 which is directly connected to the capstan 13. The capstan 13 and the reel system are arranged in this manner to be simultaneously driven by the driving motor 15. Further, the movable chassis 3 is constantly pulled by a spring 29 toward the stationary chassis 28. In the state shown in FIG. 2, the tape recorder is capable of operating to pull up any slack of the tape, to perform a fast forward (FF) action or a fast rewind (FR) action on the magnetic tape 14. Meanwhile, in the state shown in FIG. 3, the head drum 1 is allowed to enter into the tape cassette 6 and the tape 14 is ready to travel in a guided state for a recording or reproducing operation.

In the state shown in FIG. 3, the chassis 3 has been moved to the tape cassette 6 along the guide slots 4, 30 and 32 and the associated guide pins 5, 31 and 33. The head drum 1 is located inside of the tape cassette 6. The tape 14 is in a state of having been guided to a given traveling path jointly by the tape guides 11 and 12 and the head drum 1.

Under this condition, the capstan 13 is in pressed contact with the pinch roller 9 to allow the rotation of the driving motor 15 to drive the tape 14. The pressed contact force of the capstan 13 exerted on the pinch roller 9 across the tape 14 under this condition is determined by a prescribed urging force of the spring 29. Among the guide slots and the guide pins, the guide slot 4 and the guide pin 5 are stopping the movable chassis 3 from moving further toward the tape cassette 6 on the right side of the chassis 3. Meanwhile, on the left side of the chassis 3, the abutment on the pinch roller 9 of the capstan 13 is stopping the movable chassis 3 from moving further toward the tape cassette 6. These two stopping points are in alignment almost perpendicularly to the moving direction of the chassis 3. The pressed contact force of the capstan 13 on the pinch roller 9 can be determined by the pulling force of the spring 29 applied to the capstan 13 in a moment ratio obtained with the guide pin 5 serving as a fulcrum.

It is another feature of the embodiment that the capstan 13 and the head drum 1 are arranged on one and the same chassis to prevent them from moving relative to each other. This ensures stability in terms of precision.

The first embodiment is arranged as described above to use a chassis for holding the head drum and another chassis for holding the tape cassette; to use the urging means (the spring) for urging the two chassis to move toward each other; and to control and set the pressed contact force of the capstan on the pinch roller by using this urging force. The arrangement enables the embodiment to ensure a stable tape feeding force without having recourse to any complex structural arrangement.

Second Embodiment

Figure 4:
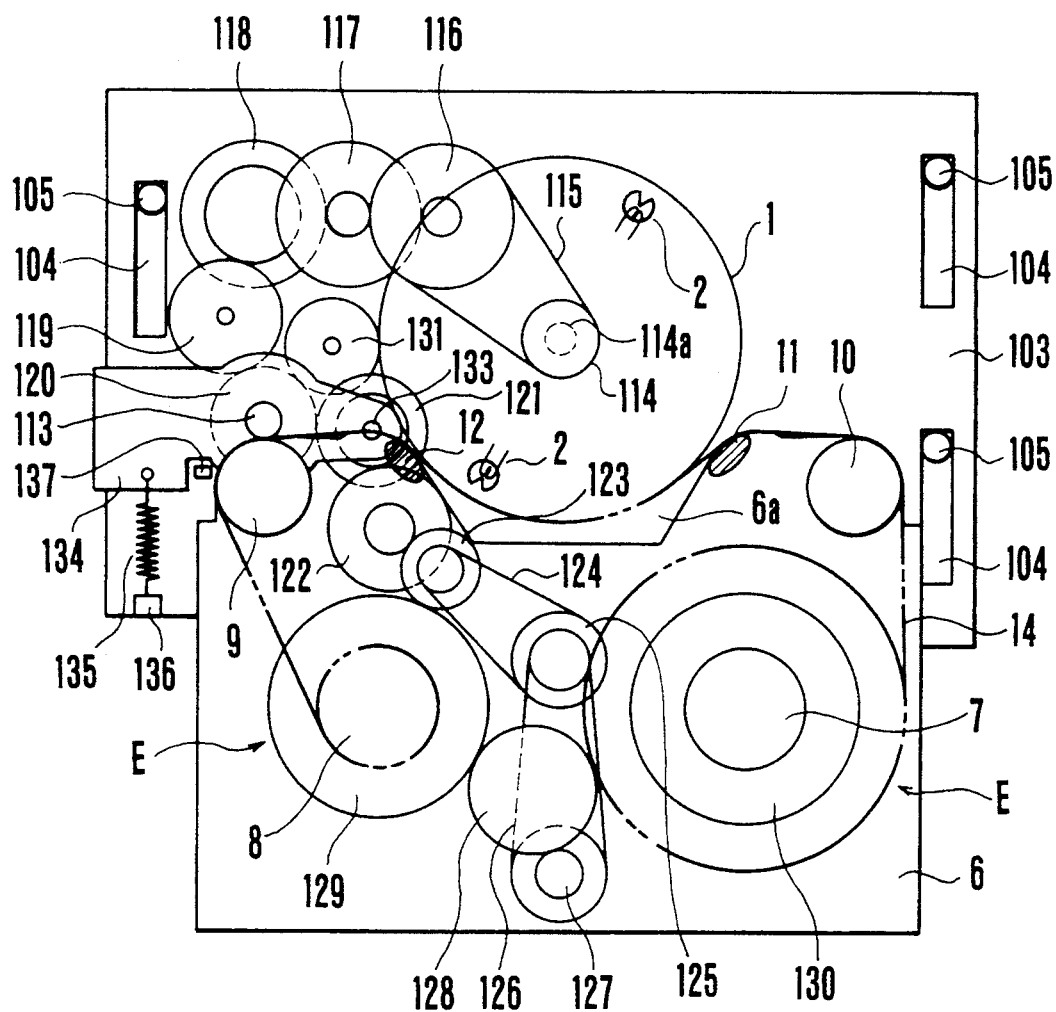
FIG. 4 is a plan view showing a tape recorder which is arranged as a second embodiment of the invention, the tape recorder being shown as in a state of recording or reproducing signals.

In a second embodiment of this invention, a turnable lever is provided on a movable chassis. The capstan is disposed on the lever. This lever is arranged to be urged to impart a necessary pressed contact force to the capstan. FIG. 4 is a plan view of a tape recorder which is arranged as the second embodiment.

Figure 5:
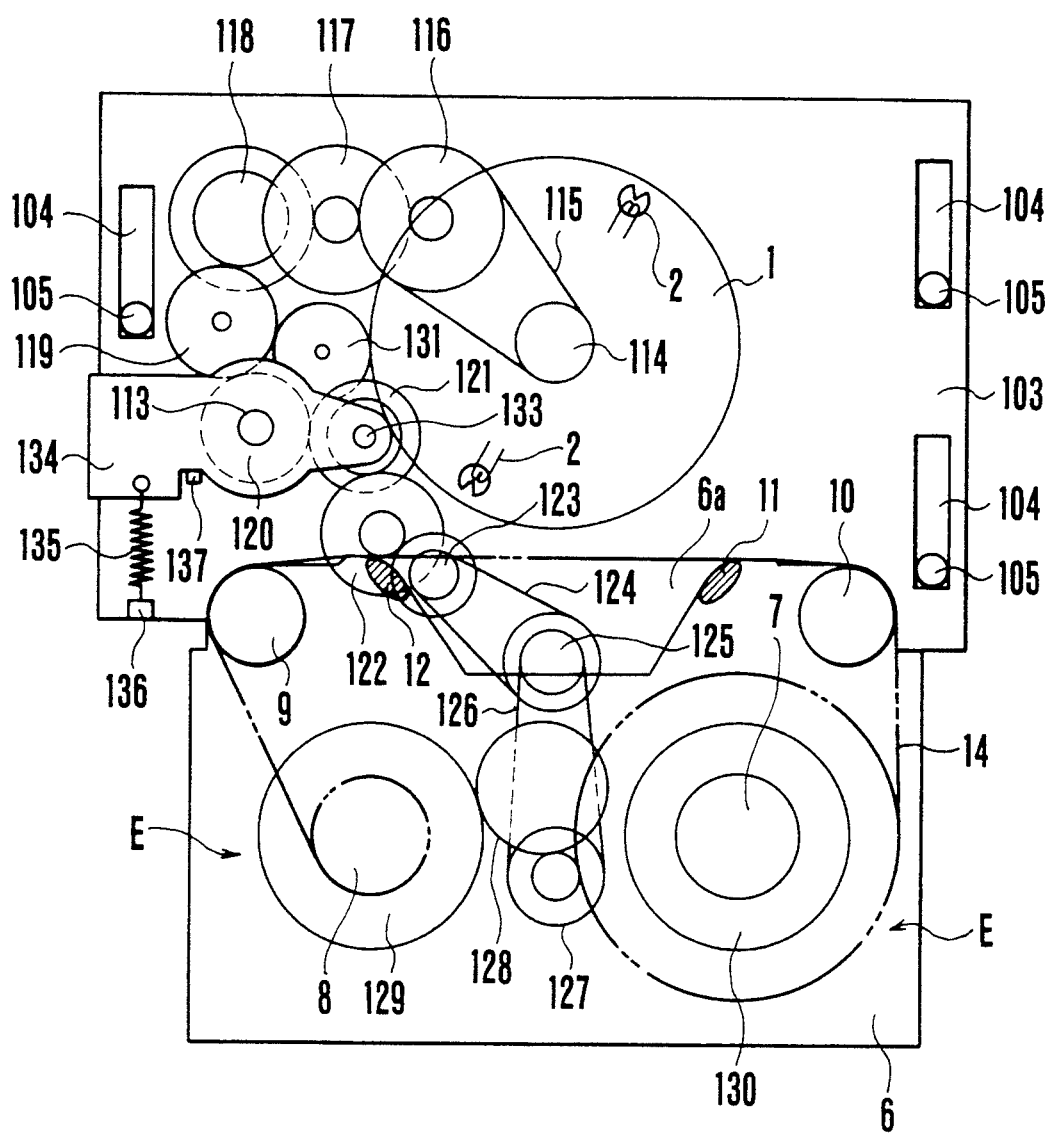
FIG. 5 is a plan view showing the tape recorder of FIG. 4 as in a state obtained immediately after loading a tape cassette.

FIG. 4 shows the tape recorder as in a recording or reproducing state. FIG. 5 shows the same tape recorder as in a state obtained immediately after loading the tape recorder with a tape cassette. Referring to FIGS. 4 and 5, a cylindrical head drum (hereinafter referred to as the drum) 1 has a plurality of magnetic heads 2 and is arranged to be rotated by a drum driving motor 114a. The drum 1 is disposed on a movable chassis 103. The chassis 103 is arranged to be movable relative to a tape cassette 6 through guide slots 104 and pins 105 which are erected on a stationary chassis which is not shown but is arranged to carry the tape cassette 6. The drum 1 is thus arranged to be inserted into an aperture part 6a provided in the cassette 6 which is carried by the stationary chassis.

The tape cassette 6 is arranged in the same manner as in the case of the first embodiment. Therefore, the details of the tape cassette 6 are omitted from the following description.

The drum driving motor 114a is arranged to be coaxial with the drum 1. The rotation of the motor 114a is arranged to be transmitted and reduced through an output shaft 114, a belt 115 and gears 116, 117, 118 and 119 to have the capstan 113 driven and rotated by a gear 120 which is connected directly to the capstan 113. This rotative driving power applied to the capstan 113 is also transmitted from the gear 120 via gears 121, 122 and 123 and a belt 124, a gear 125, a belt 126, a gear 127 and an idler gear 128 to a reel gear 129 which is disposed on the side of the take-up reel 8 of the tape cassette 6. As a result, a take-up action is performed on the tape 14. In reversing the traveling direction of the tape 14, the rotating direction of the motor 114a is reversed. The rotating direction of the idler gear 128 is reversed accordingly. This causes the idler gear 128 to revolve around the gear 127 to be connected to a reel gear 130 which is disposed on the side of the supply reel 7 of the tape cassette 6. Therefore, the tape 14 is wound around the supply reel 7. The rotation transmitting mechanism ranging from the drum motor 114a to the idler gear 128 is disposed on the movable chassis 103.

A gear 131 engages the capstan connecting gear 120 together with the gear 119. These gears 119 and 131 are selectively allowed to engage the gear 118. The gear 119 is arranged to engage a smaller diameter part of the gear 118. The gear 131 is arranged to engage a larger diameter part of the gear 118. This arrangement makes it possible to vary the rotational frequency of the capstan 113 and the reel system without changing the rotational frequency of the drum motor 114a.

The capstan 113 is disposed on a lever 134 which has its fulcrum arranged to be coaxial with the axis of the gear 121. A spring 135 is urging the capstan 113 to move toward the pinch roller 9. The pressed contact force of the capstan 113 on the pinch roller 9 is thus determined by the urging force of the spring 135. One end of the spring 135 is secured to a hook 136 which is rising from the chassis 103. Further, a stopper 137 is arranged on the chassis 103 to restrict the turning movement of the lever 134 toward the pinch roller 9.

FIG. 5 shows the drum 1 in a state of having been moved away from the tape cassette 6. This state is obtained either immediately after the tape cassette 6 is loaded or in fast forwarding or fast rewinding the tape.

When the tape recorder is in the state shown in FIG. 5, the turnable lever 134 is under the counter-clockwise urging force of the spring 135. However, the turning movement of the lever 134 is restricted by the stopper 137. Therefore, the capstan 113 is not in pressed contact with the pinch roller 9. When the tape recorder is set in a recording or reproducing mode in this state by operating an operation key or the like which is not shown, the movable chassis 103 moves downward, as viewed in FIG. 5, along the guide slots 104. The drum 1 comes into contact with the tape 14, entering the aperture part 6a of the tape cassette 6. The capstan 113 is then brought into pressed contact with the pinch roller 9 through the tape 14. The lever 134 is released from its state of being stopped by the stopper 137. At that time, the pressed contact force of the capstan 113 on the pinch roller 9 is arranged to be determined by the urging force of the spring 135 which is exerted on the turnable lever 134. This arrangement ensures that the pressed contact force can be stably attained even if the mechanical precision of the tape recorder is somewhat degraded.

The condition of FIG. 5 permits the fast tape forwarding (FF) operation or the fast tape rewinding (FR) operation by rotating the drum motor 114 which is a drive source at a higher rotational frequency than in the case of the recording or reproducing state shown in FIG. 4 for increasing the reel system driving speed.

The tape 14 slackens to a degree as much as the wrapped amount of the tape around the drum 1 when the drum 1 moves away from its position within the tape cassette 6 as shown in FIG. 4 to another position as shown in FIG. 5. It is, therefore, necessary to pull up the slack. Under this condition, if the drum 1 is simply allowed to abruptly begin to rotate at a normal speed, the tape 14 might be damaged by abrupt tape winding which causes an abnormal tape tension. To avoid such a trouble, the rotating speed of the drum 1 is arranged to gradually increase at the start of the rotation in such a way as to prevent occurrence of any sudden increase in tension.

In the second embodiment described above, the pressed contact force of the capstan 113 on the pinch roller 9 is stabilized by means of the spring 135. In the event of the FF or FR operation, the tape can be transported at a higher speed as the capstan 113 is away from the pinch roller 9. Further, the capstan 113 is arranged to be brought into contact or out of contact by moving the movable chassis 103. The timing of bringing the capstan 113 into or out of contact with the pinch roller 9 is ensured to be adequate by simply arranging the stopper 137 on the movable chassis 103.

Further, in the second embodiment described above, the center of turning movement of the lever 134 on which the capstan 113 is disposed is arranged to be coaxial with the axis of rotation of the gear 121 which transmits the driving power to the capstan 113. This arrangement precludes the possibility of inadequate transmission of rotation to the capstan 113 due to deviation of turning angle of the lever 134. In the case of the second embodiment, the turning movement of the lever 134 is arranged to be restricted by the stopper 137 which is secured to the movable chassis 103. However, that arrangement may be changed, for example, to arrange some member on the tape cassette carrying chassis to be movable following the movement of the movable chassis 103.

As described above, the capstan 113 is disposed on the turnable lever 134. The pressed contact force of the capstan 113 exerted on the pinch roller 9 is determined by the urging force of the urging means (spring) 135. This arrangement permits the pressed contact force to be accurately set and ensures a stable tape feeding force. Further, the action of bringing the capstan 113 into or out of contact with the pinch roller 9 is arranged to be performed by utilizing the relative movement of the drum 1 and the tape cassette 6. The arrangement, therefore, permits a salient reduction in number of necessary parts.

Third Embodiment

A third embodiment of this invention is arranged to permit cue and review operations with a compact tape recorder by parting the capstan from the pinch roller while leaving the tape in the state of abutting on the head drum. The following describes the third embodiment with reference to FIGS. 6 and 7.

Figure 6:
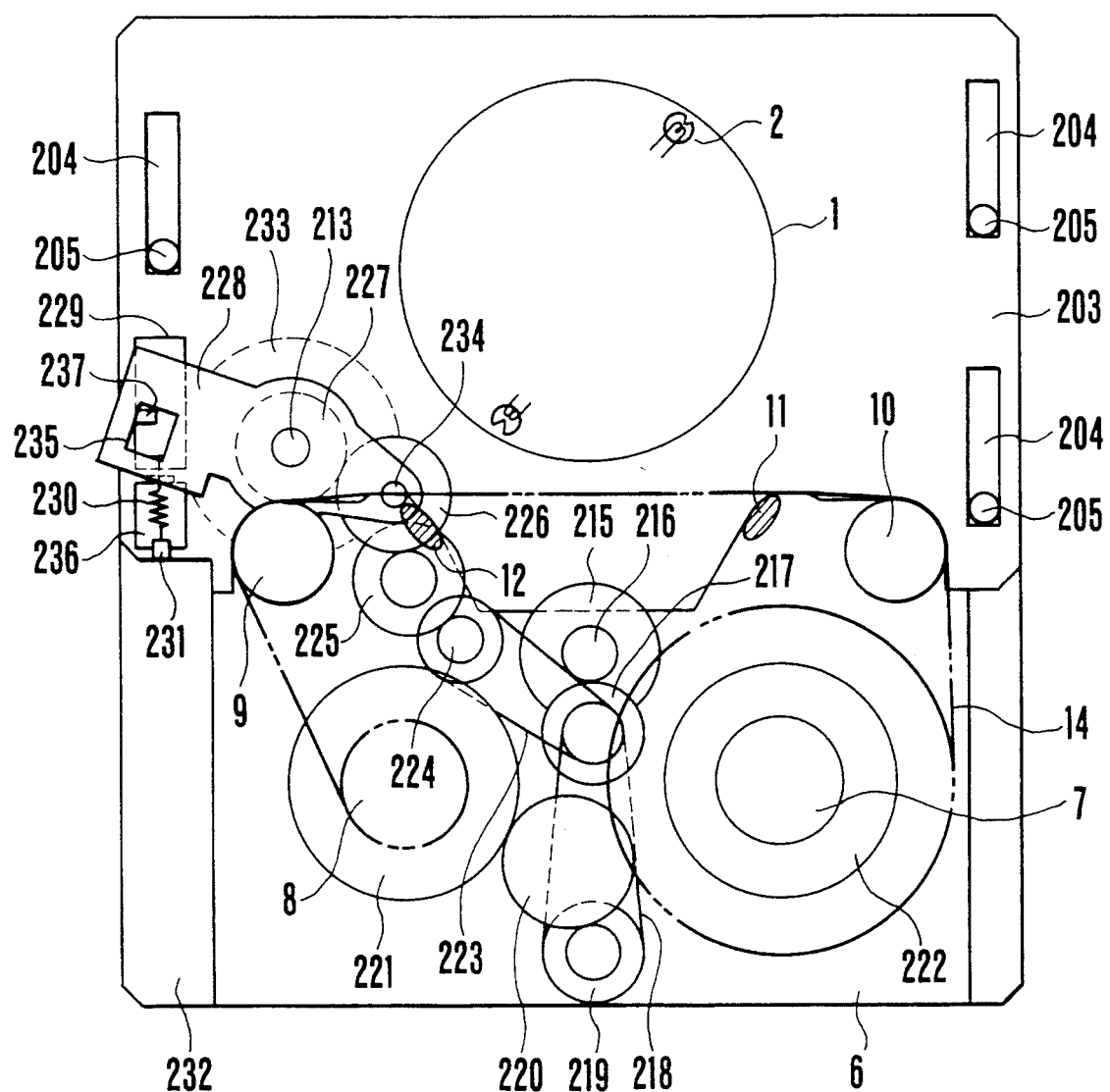
FIG. 6 is a plan view showing a tape recorder which is arranged as a third embodiment of the invention, the tape recorder being shown as in a state obtained immediately after loading a tape cassette.
Figure 7:
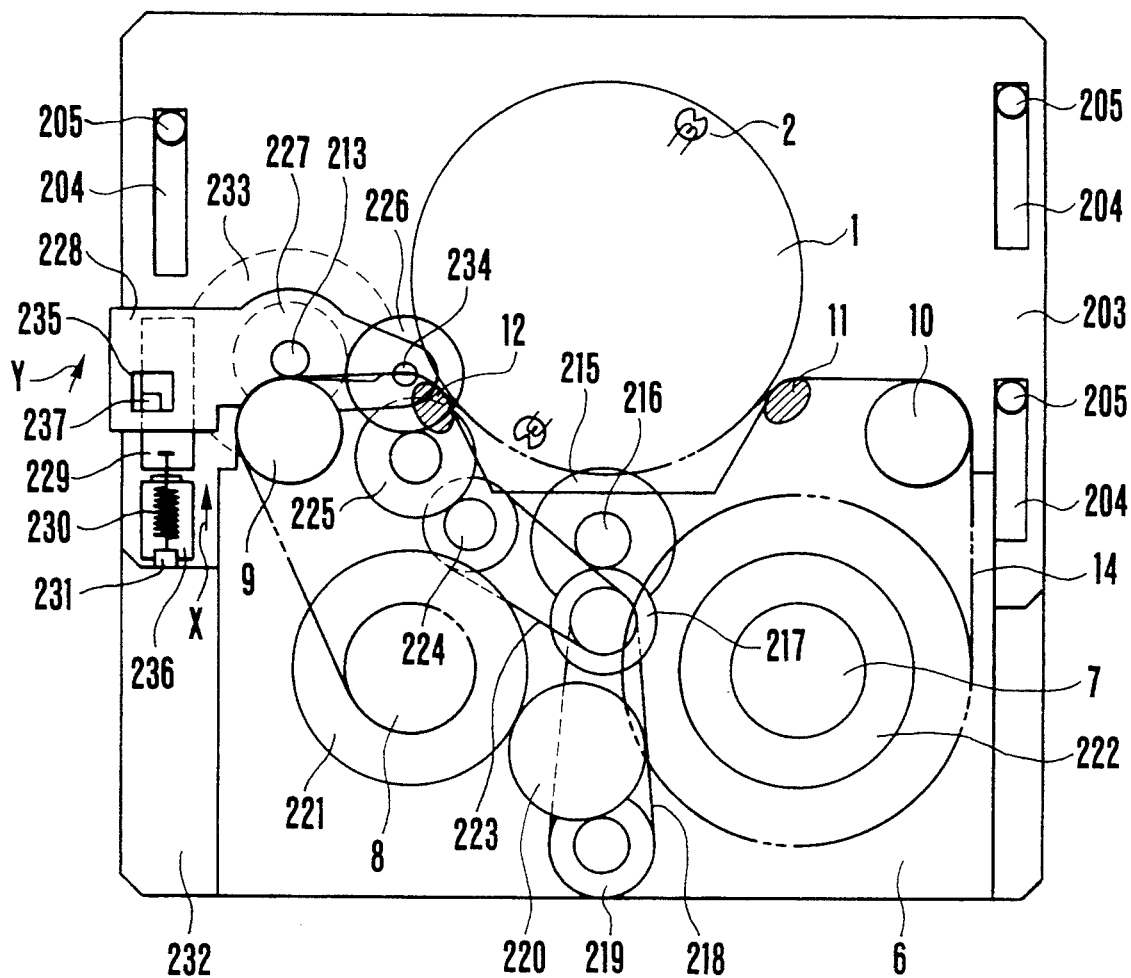
FIG. 7 is a plan view showing the tape recorder of FIG. 6 as in a state of recording or reproducing signals.

FIG. 6 shows in a plan view the arrangement of a tape recorder which is arranged according to this invention as the third embodiment thereof. The tape recorder is shown as in a state obtained immediately after loading it with a tape cassette. FIG. 7 shows the same tape recorder as in a recording or reproducing state. A drum 1 which is provided with magnetic heads 2 and the tape cassette 6 are arranged in the same manner as the first and second embodiments described in the foregoing. Therefore, the details of the drum 1 and the tape cassette 6 are omitted from the following description.

The fulcrum 234 of the turning movement of a reel system and the capstan 213 is located on a stationary chassis 232. The reel system and the capstan 213 are arranged to be rotatively driven by a driving motor 215 through a transmission system.

The details of the transmission system are as follows: In operating the reel system for taking up tape 14, a gear 216 which is mounted on the output shaft of a driving motor 215 is connected either to a gear 221 which is disposed on the side of the take-up reel or a gear 222 which is disposed on the side of the supply reel through a gear 217, a belt 218, a gear 219 and an idler gear 220. In operating the capstan 213, the gear 217 is connected to a gear 227 which is directly attached to the capstan 213 through a belt 223, gears 224 and 225 and a connection gear 226. This connecting arrangement enables the motor 215 to simultaneously drive the capstan 213 and the reel system.

The third embodiment is arranged to bring the capstan 213 into or out of contact with the pinch roller 9 in the following manner. The capstan 213 is mounted on a turnable lever 228. The turning fulcrum 234 of the lever 228 is arranged to be coaxial with the axis of the capstan connecting gear 226 which engages the gear 227 directly attached to the capstan 213. A slide lever 229 which is disposed on a movable chassis 203 is arranged to be movable vertically, as viewed in FIG. 6, by means of a mechanism which is not shown. A protruding part 237 is erected on the lever 229 and is loosely fitted into a slot 235 which is provided in the lever 228. The pressed contact force of the capstan 213 on the pinch roller 9 is arranged to be determined by the urging force of a spring 230. The spring 230 is stretched with one end thereof attached to the lever 229 and the other to a protruding part 231 provided on the movable chassis 203. The spring 230 determines the pressed contact force of the capstan 213 on the pinch roller 9 by urging the lever 228 to move toward the pinch roller 9 (counterclockwise). In other words, when the drum 1 is in the state of having entered into the tape cassette 6 as shown in FIG. 7, the other lever 229 is urged by the spring 230 to move toward the tape cassette 6 (counterclockwise). A plunger 236 is arranged to be energized with a current to push the slide lever 229 in the direction of arrow X in the case of the cue or review operation.

With the embodiment in the state of FIG. 6, the lever 228 is turned clockwise by the protruding part 237 of the lever 229, irrespective as to whether the plunger 236 is energized or not, in a direction reverse to the direction of the above-stated pressed contact (toward the tape cassette). The capstan 213 is then not brought into contact with the pinch roller 9. Under this condition, any slack of the tape can be pulled up and also the tape recorder can be set in the FF or FR mode in which the tape is to be transported at a high speed. Further, the capstan 213 is provided with a fly-wheel 233.

In the state shown in FIG. 7, the drum 1 has been moved into the tape cassette 6 from its position shown in FIG. 6. Then, the magnetic tape 14 is guided by tape guides 11 and 12 into a given position relative to the drum 1. The lever 229 is moved by movement of the chassis 203 to have the protruding part 237 of the lever 229 abut on one end part of the slot 235 of the lever 228 which is opposite to another end part on which it abuts in the case of FIG. 6. The lever 228 is thus urged to move toward the pinch roller 9. Under this condition, a predetermined amount of pressed contact force is exerted on the pinch roller 9 by the moment of the pressure of the spring 230 obtained in relation to the fulcrum 234 of the lever 228. Since the axis of the capstan connecting gear 226 is coaxial with the fulcrum 234 of the lever 228, the engaging state of gears remains unchanged to ensure smooth driving.

The tape recorder can be set in a recording or reproducing mode in the state shown in FIG. 7. However, if the tape recorder is set in a cue or review mode, the plunger 236 is energized with a current. The plunger 236 then causes the slide lever 229 to move in the direction of arrow X. The turnable lever 228 turns in the direction of arrow Y. Therefore, the capstan 213 can be moved away from the pinch roller 9, leaving the tape 14 in the state of being wrapped around the drum 1.

Under this condition, the tape recorder can be operated in the cue or review mode with the tape transported at a high speed by driving the reel with the driving motor 215. Further, while the third embodiment is arranged to move the slide lever 229 by means of the plunger 236, the arrangement may be changed to move the slide lever 229 by means of some cam that is arranged to alter its position according to the mode selected.

In the third embodiment described above, the capstan 213 is disposed on the turnable lever 228 and the pressed contact force of the capstan 213 on the pinch roller 209 is arranged to be controllably set by the urging means (spring) 230 to ensure a stable tape feeding force. The capstan 213 is movable away from the pinch roller 9 while leaving the tape 14 in the state of being wrapped around the drum 1. Therefore, the tape recorder can be arranged to be operable in various modes without increasing the size of the capstan driving motor.

Fourth Embodiment

In the case of the third embodiment of the invention, the cue or review mode is attained by moving the capstan away from the pinch roller by means of a moving mechanism consisting of the plunger and the slide lever. Whereas, a fourth embodiment of the invention is arranged to attain these modes by moving a chassis. The following describes the fourth embodiment with reference to drawings.

FIGS. 8 to 13 show a tape recorder which is arranged as the fourth embodiment of this invention. The mechanism of the tape recorder is shown in plan views as in various states obtained in different operation modes. The tape cassette to be used by the fourth embodiment is the same as the one used by other embodiments described and thus requires no further description.

Figure 8:
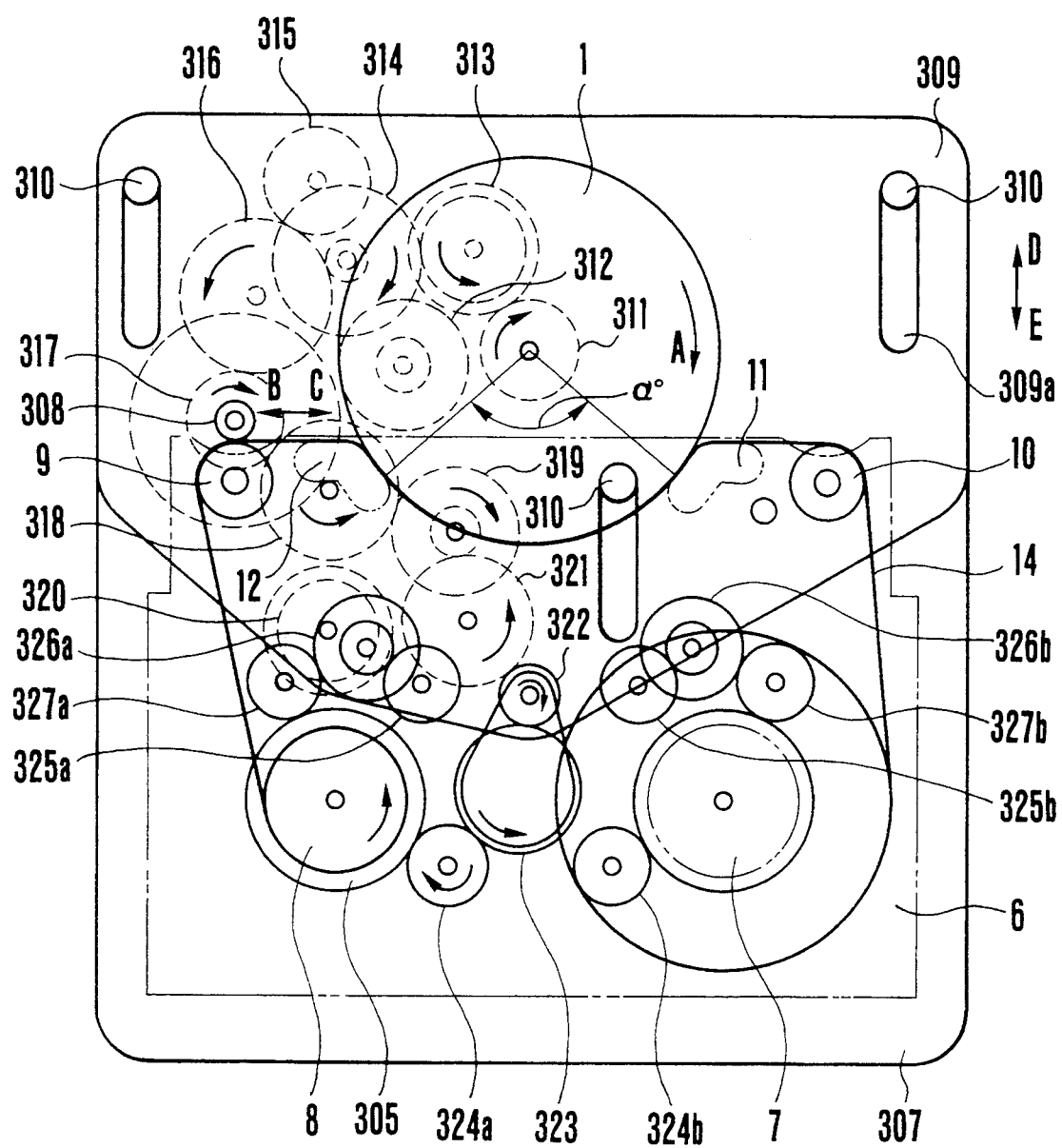
FIG. 8 is a plan view showing a fourth embodiment of the invention as in a recording mode.

FIG. 8 shows the tape recorder as in a recording state. A plurality of magnetic heads which are not shown are mounted on a cylindrical head drum 1. A drum driving motor which is not shown is disposed within the head drum 1. This motor serves as a drive source also for reels 7 and 8. A stationary chassis 307 is arranged to carry the tape cassette 6. A capstan 308 and the head drum 1 are mounted on a movable chassis 309. The movable chassis 309 is arranged to be slidable in the longitudinal direction of guide slots 309a to a given distance relative to the stationary chassis 307. Guide shafts (or pins) 310 are erected on the stationary chassis 307 and arranged to guide the sliding movement of the movable chassis 309 along a pair of the guide slots 309a. A driving gear 311 is arranged to be coaxial with the shaft of the above-stated drum driving motor. A change-over mechanism which is not shown is arranged to selectively cause a low speed gear 312 or a high speed gear 313 to engage the driving gear 311. An intermediate gear 314 is arranged to selectively engage the low speed gear 312 or the high speed gear 313. The mechanism of the tape recorder further includes a rotating direction inverting gear 315; an intermediate gear 316; a gear 315 which is coaxial with the capstan 308; an intermediate gear 318; a gear 319 for a low speed; and a gear 320 for a high speed. The intermediate gear 318 is arranged to selectively engage the low speed gear 319 or the high speed gear 320. Another intermediate gear 321 is arranged to selectively engage the gear 319 or the gear 320. The mechanism also includes an intermediate gear 322; a swing gear 323; a take-up reel connecting gear 324a; a supply reel connecting gear 324b; and gears 325a, 325b, 326a, 326b, 327a and 327b which are arranged to connect the take-up reel and the supply reel for a high speed operation.

In the recording state shown in FIG. 8, the stationary chassis 307 and the movable chassis 309 are in their first relative positions. Under this condition, the magnetic tape 14 is wrapped a given degree of angle α around the head drum 1 which has been allowed to enter the aperture part of the tape cassette 6. When the drum driving motor which is not shown but is disposed within the head drum 1 causes the head drum 1 to rotate in the direction of arrow A, a driving power in the direction of arrow A is imparted to the coaxial driving gear 311. The driving power of the motor is transmitted to the gears one after another in the sequence of the gears 311, 313, 314, 316, 317, 318, 319, 321, 322, 323, 324a and 305. As a result, the magnetic tape 14 is wound around the take-up reel 8. The capstan 308 is pushed against the pinch roller 9 which is one of two pinch rollers disposed within the tape cassette 6. The capstan 308 thus causes the tape 14 to travel in the direction of arrow B. Then, recording can be performed by the magnetic heads which are fixedly mounted on the head drum 1.

Figure 9:
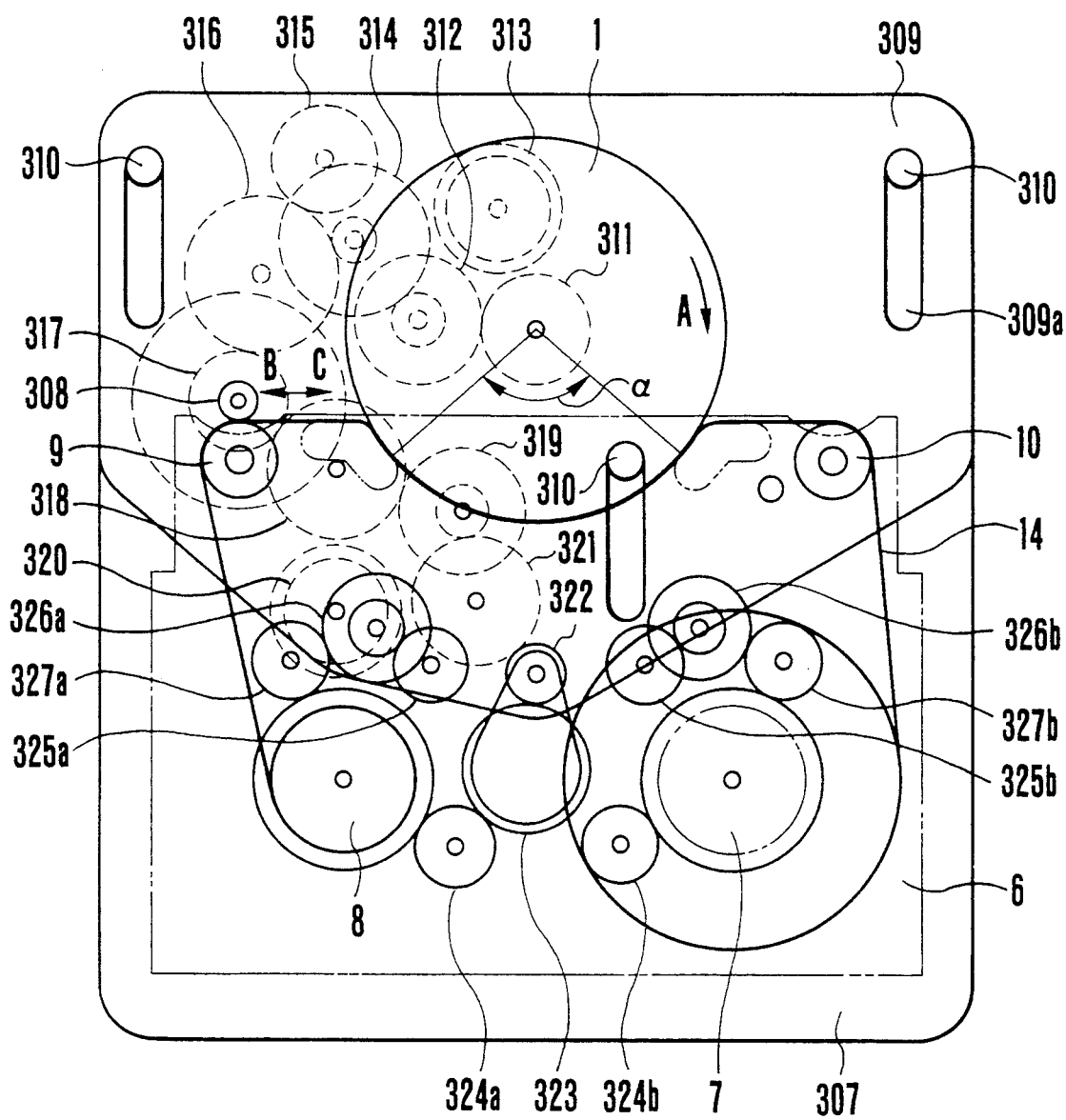
FIG. 9 is a plan view showing the fourth embodiment as in a reproducing mode.

FIG. 9 shows the tape recorder as in a reproducing state. In this instance, unlike the recording state of FIG. 8, the above-stated change-over mechanism causes the low speed gear 312, instead of the high speed gear 313, to engage the driving gear 311. In the case of this tape recorder which is arranged as the fourth embodiment of the invention, the head drum 1 is caused to rotate for reproduction at a speed which is twice as high as its rotating speed for recording. Meanwhile, the rotational frequency transmitted to the capstan 308 is reduced to one half through the gears 311, 312, 314, 316 and 317. The magnetic tape 14 then travels in the direction of arrow B at the same speed as the recording speed.

Figure 10:
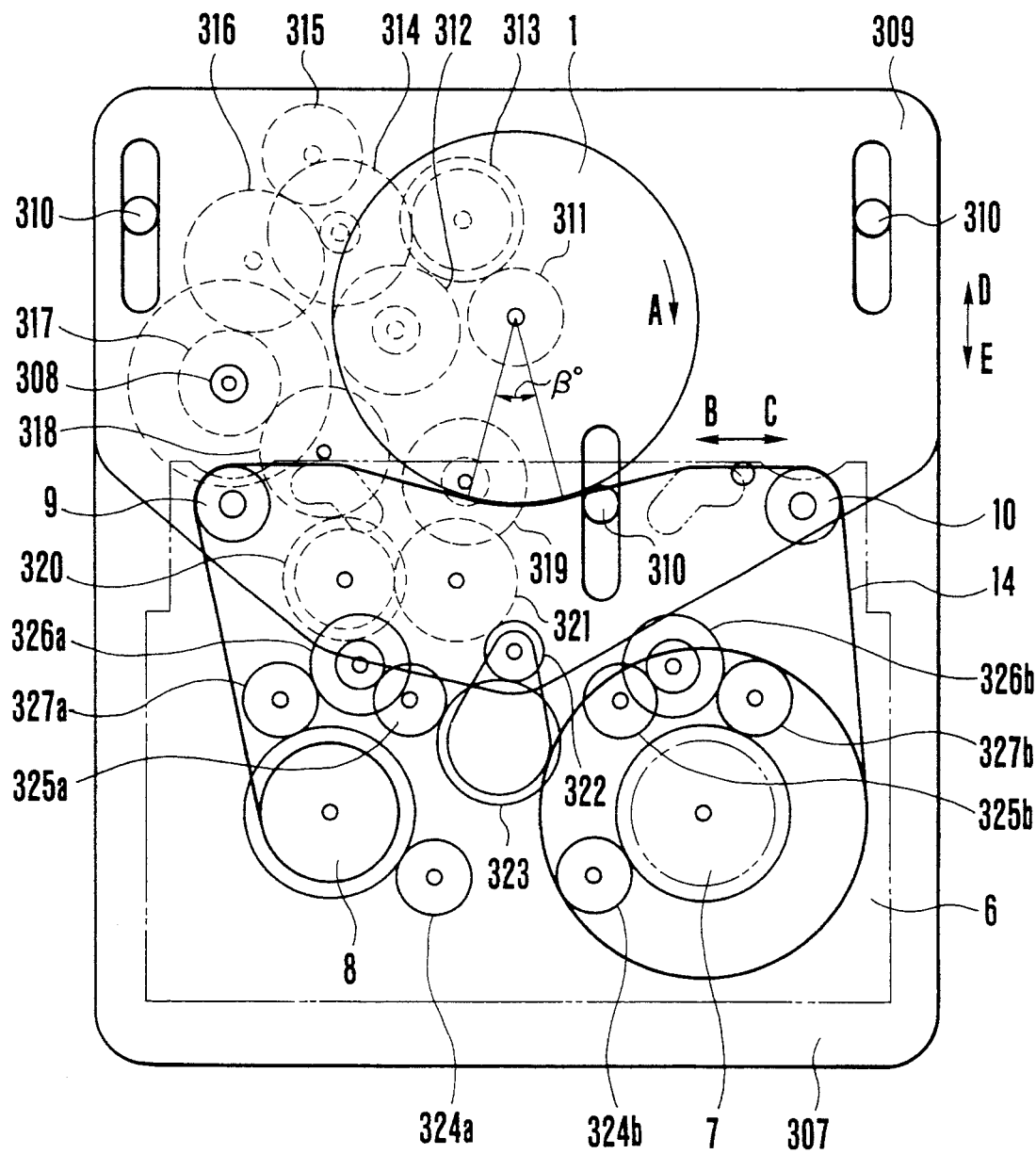
FIG. 10 is a plan view showing the fourth embodiment as in a cue mode.
Figure 11:
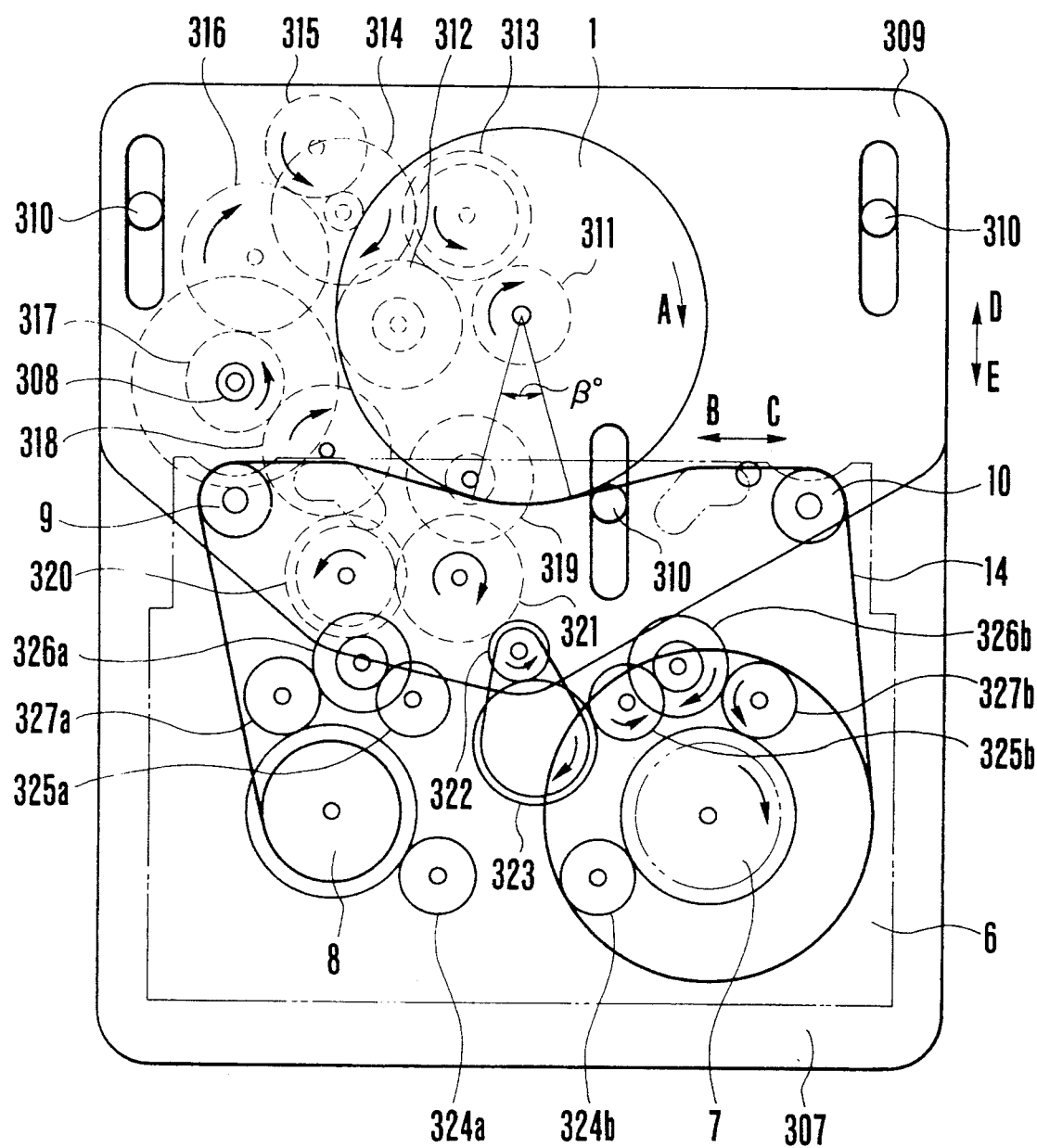
FIG. 11 is a plan view showing the fourth embodiment as in a review mode.

FIGS. 10 and 11 show the tape recorder respectively as in an index forward (cue) state and as in an index reverse (review) state. In these cases, unlike the recording or reproducing state described above, the movable chassis 309 has been moved and guided by the sliding guide shafts 310 within the guide slots 309a, in the direction of arrow D, relative to the stationary chassis 307 (the chassis are in third relative position). With the movable chassis 309 in this position, the tape 14 is wrapped around the head drum 1 a degree of angle β which is less than the above-stated angle α. Under this condition, some of signals recorded on the tape, such as an index signal or the like is readable by the magnetic heads fixedly mounted on the head drum 1. Meanwhile, the capstan 308 is away from each of the pinch rollers. The capstan 308 is then in a position to engage the gears 325a, 325b instead of the gears 324a and 324b. The rotating speed of each of the reels is accelerated from the recording or reproducing speed. The gear engaging the gears 318 and 321 is arranged to be changeable from the low speed gear 319 over to the high speed gear 320 and vice versa. Under this condition, while the head drum rotating speed remains unchanged, the reel rotating speed is arranged, including the above-stated change-over between the gears 312 and 313, to be selectable from among four different speeds. In the case of the review mode shown in FIG. 11, the position of gear 314 is changed to engage the inverting gear 315 while the gear 313 is still engaging the gear 314. All the gears located on the downstream side of the gear 316 then come to reversely rotate. As a result, the gear 323 engages the gear 325b to cause the supply reel 7 to rotate clockwise as indicated with an arrow. The magnetic tape 14 comes to travel in the direction of arrow C.

Figure 12:
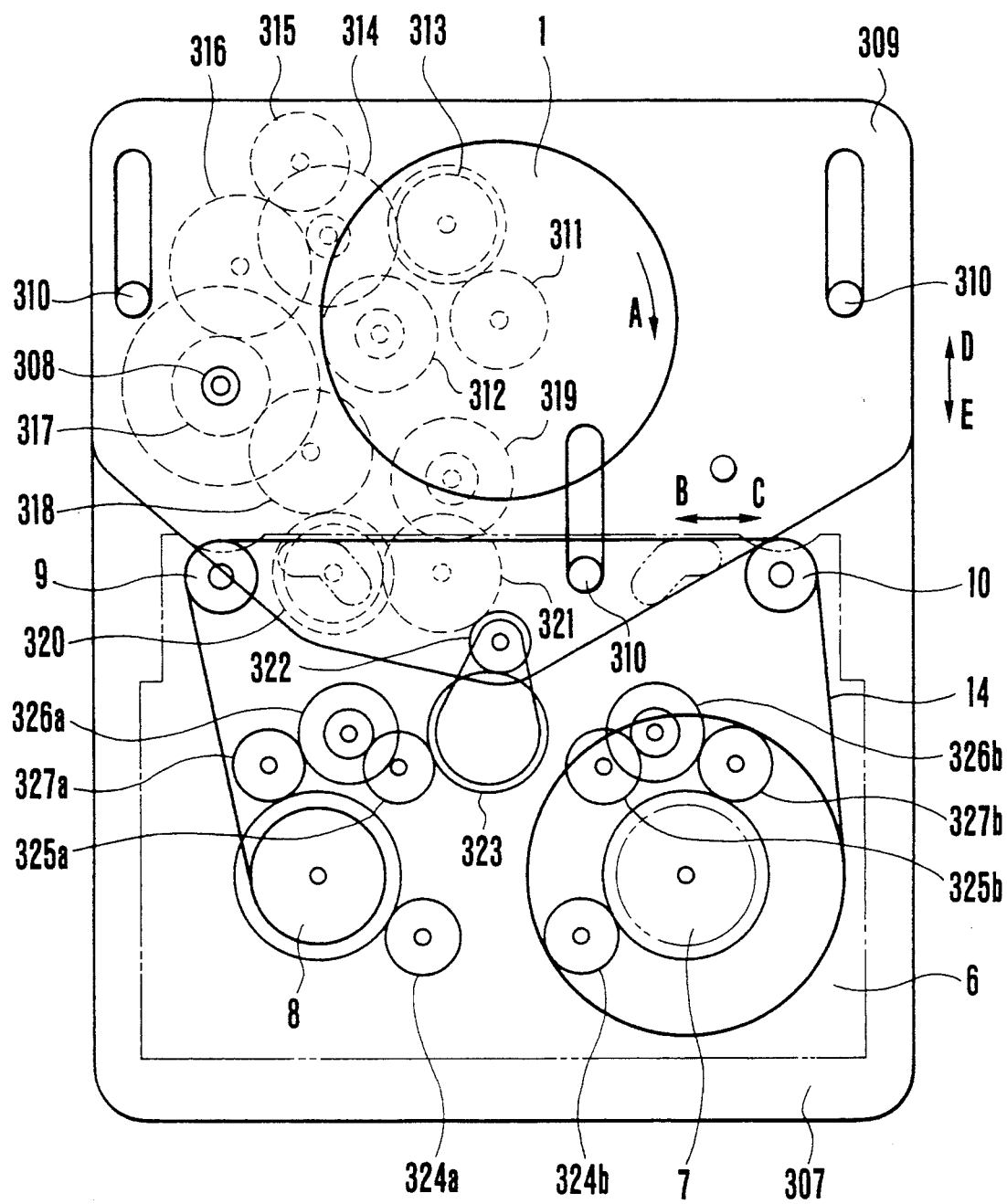
FIG. 12 is a plan view showing the fourth embodiment as in a fast forward mode.
Figure 13:
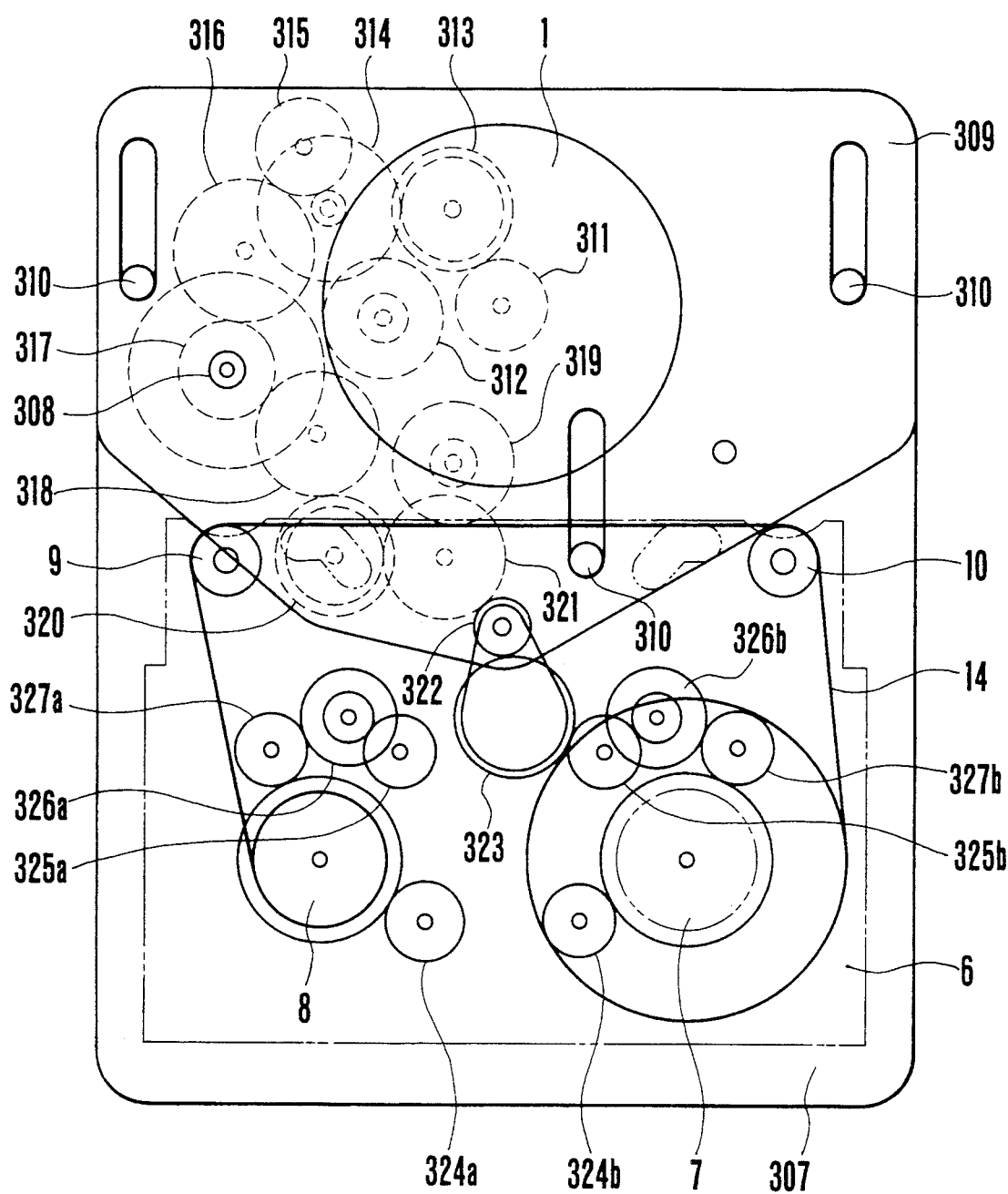
FIG. 13 is a plan view showing the fourth embodiment as in a tape rewinding mode.

The tape recorder is shown as in the FF mode in FIG. 12 and as in the FR mode in FIG. 13. In these modes, the position of the movable chassis 309 is shifted further in the direction of arrow D relative to the stationary chassis 307 (the second relative position). The head drum 1 is completely separated from the magnetic tape 14. In this instance, the allocation of gears is identical with the gear allocation made in the cue or review mode. Under this condition, the magnetic tape 14 can be transported at a faster speed by increasing the rotating speed of the head drum 1 from the speed for the cue or review mode.

In the case of this embodiment, a plurality of gear mechanisms are used for rotating the reels and for change-over of the rotating speed. However, the invention is not limited to the gear allocation and the change-over mechanism illustrated. The arrangement of the embodiment of course may be variously changed and modified without departing from the true scope and spirit of the invention in its broader aspects.

This embodiment is arranged, as described above, to permit the chassis which carries the head drum and the capstan to be set in any of three positions in relation to another chassis which firmly holds and carries the tape cassette. In accordance with the invented arrangement, the tape loading mechanism which has heretofore necessitated a complex, highly precise and expensive arrangement can be simplified for cost reduction without impairing the functions of the tape recorder.

In the foregoing description of the fourth embodiment, no urging means for urging the capstan to be in pressed contact with the pinch roller is described. However, the pressed contact force of the capstan on the pinch roller can be adequately controlled and set by applying, to the embodiment, the urging means described for the first embodiment or for other embodiments.

What is claimed is:

1. A recording or reproducing apparatus for recording or reproducing signals on or from a tape-shaped recording medium by using a cassette which has a pinch roller and a pair of tape reels around which the tape-shaped recording medium is wound, by guiding and causing the tape-shaped recording medium to travel in an oblique posture relative to a rotary drum which has heads, comprising:

a) a first chassis arranged to hold the cassette;
   b) a second chassis arranged to hold the rotary drum;
   c) a capstan disposed on said second chassis and arranged to control the travel of the tape-shaped recording medium;
   d) a moving mechanism arranged to relatively move said first chassis and said second chassis so that the rotary drum is positioned close to and apart from the cassette, and said moving mechanism being arranged to control said first chassis and said second chassis to be set in a first relative position in which signals can be recorded or reproduced with the tape-shaped recording medium sandwiched between said capstan and the pinch roller in a state of being wrapped around the rotary drum and in a second relative position in which the recording medium is situated apart from the rotary drum and said capstan is situated apart from the pinch roller; and
   e) urging means for pressing said capstan against the pinch roller by an urging force thereof.

2. An apparatus according to claim 1, wherein said urging means is disposed said second chassis.

3. An apparatus according to claim 1 or 2, wherein said moving mechanism is arranged to move said second chassis.

4. An apparatus according to claim 1 or 2, wherein a plurality of guide parts, each including a guide pin and a guide slot, are provided between said first chassis and said second chassis, and wherein, in recording or reproducing signals, the guide pin abuts on one end of the guide slot in one guide part among said plurality of guide parts.

5. An apparatus according to claim 4, wherein a point at which the guide pin abuts on one end of the guide slot and a point at which said capstan abuts on the pinch roller are located almost on a straight line which is perpendicular to the moving direction of said chassis.

6. An apparatus according to claim 1, further comprising a turning member arranged on said second chassis to be turnable, said capstan being mounted on said turning member, and said urging means being disposed between said turning member and said second chassis.

7. An apparatus according to claim 6, wherein said urging means is arranged to urge said turning member to move toward said first chassis.

8. An apparatus according to claim 6 or 7, further comprising a restricting part arranged to restrict a turning movement of said turning member.

9. An apparatus according to claim 6, further comprising a pressed-contact releasing part for parting said capstan from the pinch roller when the tape-shaped recording medium travels.

10. An apparatus according to claim 6, wherein said moving mechanism is arranged to control said first chassis and said second chassis to be set in a third relative position in which the recording medium is wrapped around the rotary drum at a smaller angel than in the first relative position and said capstan is situated apart from the pinch roller.

11. A recording or reproducing apparatus for recording or reproducing signals on or from a tape-shaped recording medium by using a cassette which has a pinch roller and a pair of tape reels around which the tape-shaped recording medium is wound, by guiding and causing the tape-shaped recording medium to travel in an oblique posture relative to a rotary drum which has heads, comprising:

a) a first chassis arranged to hold the cassette;
   b) a second chassis arranged to hold the rotary drum;
   c) a capstan disposed on said second chassis and arranged to control the travel of the tape-shaped recording medium;
   d) a moving mechanism arranged to relatively move said first chassis and said second chassis so that the rotary drum is positioned close to and apart from the cassette, and said moving mechanism being arranged to control said first chassis and said second chassis to be set in a first relative position in which signals can be recorded or reproduced with the tape-shaped recording medium sandwiched between said capstan and the pinch roller in a state of being wrapped around the rotary drum and in an second relative position in which the recording medium is situated apart from the rotary drum and said capstan is situated apart from the pinch roller;
e) urging means for pressing said capstan against the pinch roller by a urging force thereof;
f) driving means for driving the rotary drum to rotate;
g) a pair of reel engaging parts arranged to render the tape reels to be rotatable by engaging the tape reels; and
h) driving power transmission means for transmitting a driving power of said driving means to said capstan and to said par of reel engaging parts.

12. An apparatus according to claim 11, further comprising a turning member arranged on said second chassis to be turnable, said capstan being disposed on said turning member, and said urging means being disposed between said turning member and said second chassis.

13. An apparatus according to claim 12, wherein said driving power transmission means has a member which is arranged to transmit the driving power to said capstan by rotation, and wherein the axis of the rotation is arranged to coincide with the center of a turning movement of said turning member.

14. A recording or reproducing apparatus for recording or reproducing signals on or from a tape-shaped recording medium by using a cassette which has a pinch roller and a pair of tape reels around which the tape-shaped recording medium is wound, by guiding and causing the tape-shaped recording medium to travel in an oblique posture relative to a rotary drum which has heads, comprising:
a) a first chassis arranged to hold the cassette;
b) a second chassis arranged to hold the rotary drum;
c) a capstan disposed on said second chassis and arranged to control the travel of the tape-shaped recording medium;
d) a moving mechanism arranged to relatively move said first chassis and said second chassis so that the rotary drum is positioned close to and apart from the cassette, and said moving mechanism being arranged to control said first chassis and said second chassis to be set in a first relative position in which signals can be recorded or reproduced with the tape-shaped recording medium sandwiched between said capstan and the pinch roller in a state of being wrapped around the rotary drum, in a second relative position in which the recording medium is situated apart from the rotary drum and said capstan is situated apart from the pinch roller, and in a third relative position in which the recording medium is wrapped around the rotary drum at a smaller angle than in the first relative position and said capstan is situated apart from the pinch roller; and
e) urging means for pressing said capstan against the pinch roller by an urging force thereof.

15. A recording or reproducing apparatus for recording or reproducing signals on or from a tape-shaped recording medium by using a cassette which has a pinch roller and a pair of tape reels around which the tape-shaped recording medium is wound by guiding and causing the tape-shaped recording medium to travel in an oblique posture relative to a rotary drum which has heads, comprising:
a) a first chassis arranged to hold the cassette;
b) a second chassis arranged to hold the rotary drum;
c) a capstan disposed on said second chassis and arranged to control the travel of the tape-shaped recording medium;
d) a moving mechanism arranged to relatively move said first chassis and said second chassis so that the rotary drum is positioned close to and apart from the cassette, and said moving mechanism being arranged to control said first chassis and said second chassis to beset in a first relative position in which signals can be recorded or reproduced with the tape-shaped recording medium sandwiched between said capstan and the pinch roller in a state of being wrapped around the rotary drum and in a second relative position in which the recording medium is situated apart from the rotary drum and said capstan is situated apart from the pinch roller;
e) urging means for pressing said capstan against the pinch roller by an urging force thereof;
f) a pair or reel engaging parts arranged to render the tape reels to be rotatable by engaging the tape reels; and
g) driving means for driving the rotary drum, said capstan and said pair of reel engaging parts.

16. An apparatus according to claim 15, wherein said driving means includes a first driving motor and a second driving motor, said first driving motor being arranged to drive the rotary drum and said second driving motor being arranged to drive said capstan and said pair of reel engaging parts.

17. An apparatus according to claim 16, further comprising driving power transmission means for transmitting a driving power of said second driving motor to said capstan and to said pair of reel engaging parts.

18. An apparatus according to claim 17 further comprising a turning member arranged on said second chassis to be turnable, said capstan being disposed on said turning member and said urging means being disposed between said turning member and said second chassis.

19. An apparatus according to claim 18, wherein said driving power transmitting means has a member which is arranged to transmit the driving power to said capstan by rotation, the axis of the rotation being arranged to coincide with the center of a turning movement of said turning member.

20. A recording or reproducing apparatus for recording or reproducing signals on or from a tape-shaped recording medium by using a cassette which has a pinch roller and a pair of tape reels around which the tape-shaped recording medium is wound, by guiding and causing the tape-shaped recording medium to travel in an oblique posture relative to a rotary drum which has heads, comprising:
a) a first chassis arranged to hold the cassette;
b) a second chassis arranged to hold the rotary drum;
c) a moving mechanism arranged to relatively move said first chassis and said second chassis so that the rotary drum is positioned close to and apart from the cassette, and said moving mechanism being arranged to control said first chassis and said second chassis to be set in a first relative position in which signals can be recorded or reproduced with the tape-shaped recording medium sandwiched between the capstan and the pinch roller in a state of being wrapped around the rotary drum and in a second relative position in which the recording medium is situated apart from the rotary drum and said capstan is situated apart from the pinch roller;

d) a turning member on said second chassis to be turnable;

e) a capstan disposed on said turning member and arranged to control the travel of the tape-shaped recording medium;

f) urging means arranged between said turning member and said second chassis to urge said turning member to move toward said first chassis; and g) a pressed-contact releasing part for parting said capstan from the pinch roller when the tape-shaped recording medium travels.

21. An apparatus according to claim 20, further comprising a restricting part for restricting a turning movement of said turning member.

* * * * *

UNITED STATES PATENT AND TRADEMARK OFFICE
CERTIFICATE OF CORRECTION

PATENT NO. : 5,355,264
DATED : October 11, 1994
INVENTOR(S) : Osamu Nagatsuka et al.

It is certified that error appears in the above-identified patent and that said Letters Patent is hereby corrected as shown below:

Col. 2, line 11.  Delete "of".

Col. 2, line 35.  Delete "of".

Col. 3, line 62.  Change ":" to -- . --.

Col. 5, line 6.  Delete "a".

Col. 12, line 15.  After "disposed" insert -- on --.

Col. 12, line 50.  Change "angel" to -- angle --.

Col. 13, line 12.  Change "a" to -- an --.

Col. 14, line 15.  Change "beset" to -- be set --.

Signed and Sealed this

Tenth Day of January, 1995

Attest:

BRUCE LEHMAN

Attesting Officer

Commissioner of Patents and Trademarks